United States Patent [19]

Vogelsang

[11] Patent Number: 5,713,700
[45] Date of Patent: Feb. 3, 1998

[54] METHOD OF PROVIDING SUBTERRANEAN CABLE SYSTEMS

[75] Inventor: Horst Vogelsang, Herten/Westf., Germany

[73] Assignee: Dipl-Inc. Dr. Ernst Vogelsang GmbH & Co.KG, Herten, Germany

[21] Appl. No.: 441,483

[22] Filed: May 15, 1995

Related U.S. Application Data

[63] Continuation-in-part of Ser. No. 77,210, Jun. 14, 1993, abandoned.

[51] Int. Cl.⁶ .................................................. F16L 1/00
[52] U.S. Cl. ........................ 405/154; 138/108; 174/68.3; 405/157
[58] Field of Search .......................... 405/154, 156, 405/157; 174/68.3; 138/108, 111, 113, 114, 121, 124, 153, 161

[56] References Cited

U.S. PATENT DOCUMENTS

| | | | |
|---|---|---|---|
| 3,132,415 | 5/1964 | Johnson et al. | 405/154 X |
| 4,407,351 | 10/1983 | Backlund | 405/157 X |
| 4,410,012 | 10/1983 | Redding et al. | 405/157 X |
| 4,571,450 | 2/1986 | Duffy | 174/68.3 |
| 4,688,890 | 8/1987 | DeMeo et al. | 405/154 X |
| 4,892,442 | 1/1990 | Shoffner | 405/154 |
| 5,027,864 | 7/1991 | Conti et al. | 174/68.3 X |
| 5,038,834 | 8/1991 | Siegfried | 138/108 X |
| 5,048,572 | 9/1991 | Levine | 138/121 |
| 5,087,153 | 2/1992 | Washburn | 405/154 |
| 5,145,845 | 9/1992 | Winter et al. | 138/121 X |
| 5,238,328 | 8/1993 | Adams et al. | 174/68.3 X |
| 5,503,191 | 4/1996 | Morris | 138/108 X |

FOREIGN PATENT DOCUMENTS

| | | | |
|---|---|---|---|
| 3529541 | 2/1987 | Germany | 174/68.3 |
| 3539304 | 5/1987 | Germany | 174/68.3 |

*Primary Examiner*—Dennis L. Taylor
*Attorney, Agent, or Firm*—Herbert Dubno

[57] ABSTRACT

A method of laying a cable system in which the cable guide tube has internal ribs alternating in helical direction and of dimensions and number designed for particular cable radii and cross section to allow the cable, whether a single cable or a bundle or cables to be blown through about 2000 m of the tube with 90 kN of force or to be pulled by a strand through the conduit with a force of 2.5 kN over a stretch of 1400 m without damage to the cable.

10 Claims, 7 Drawing Sheets

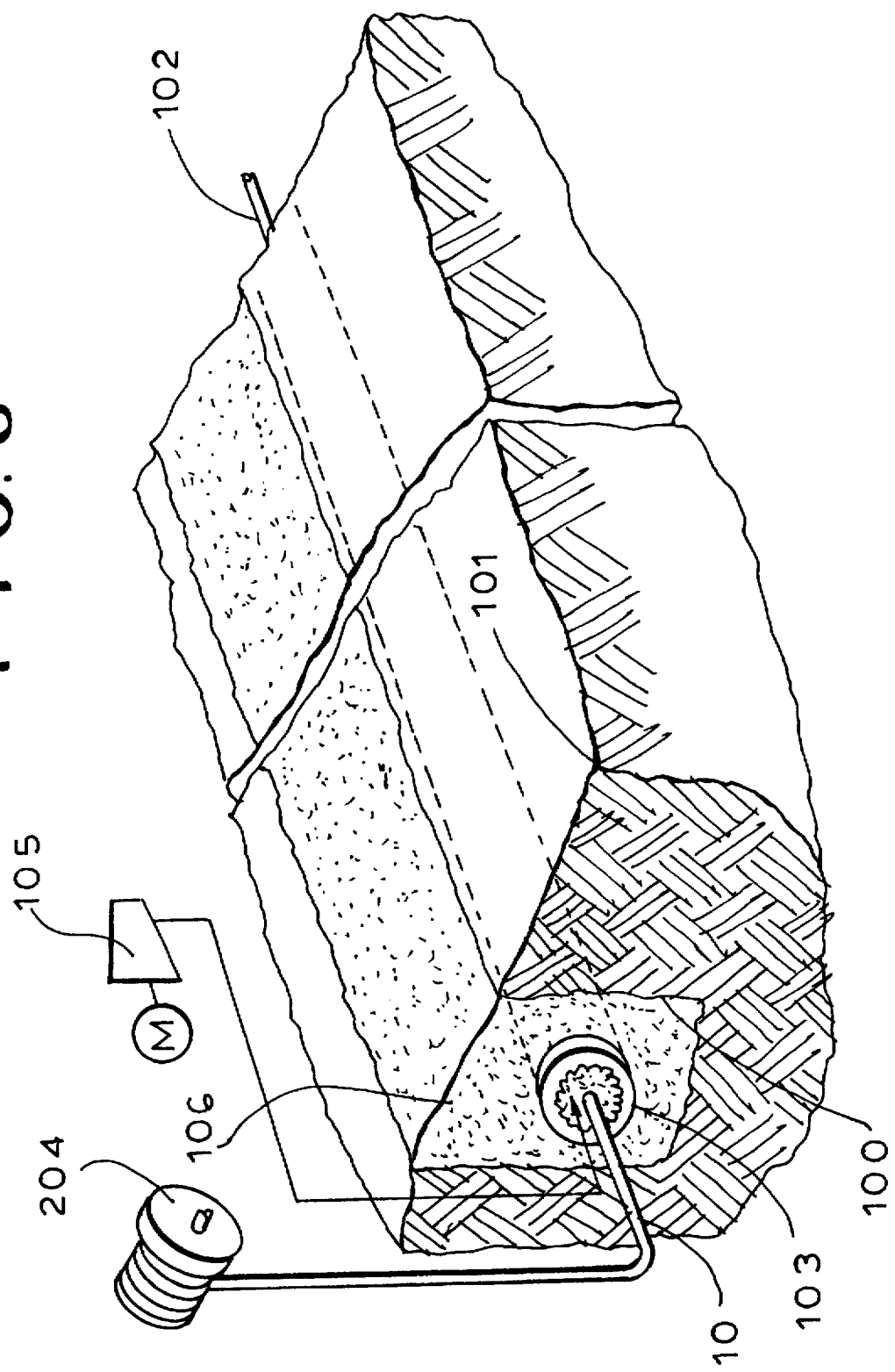

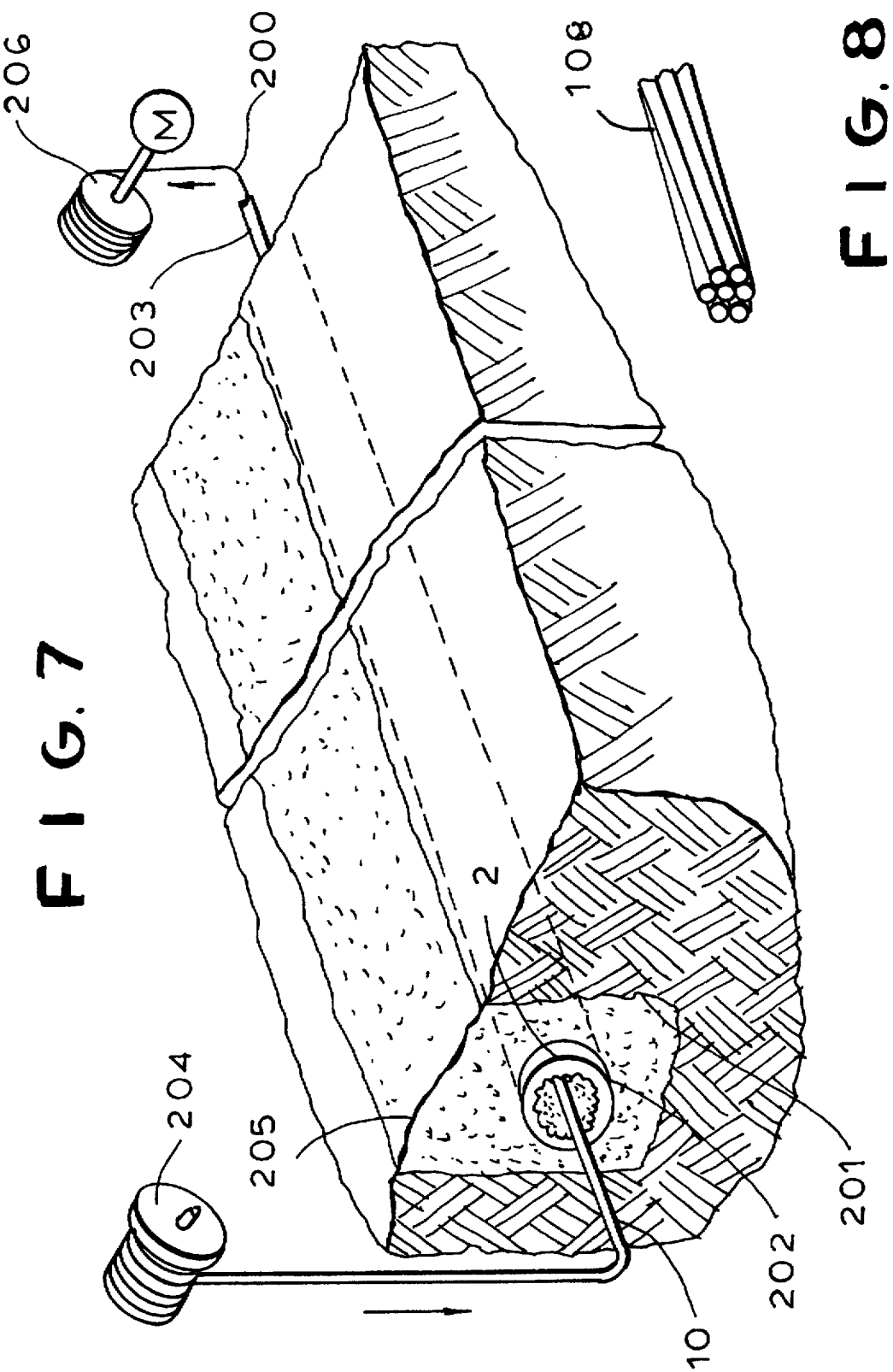

METHOD OF PROVIDING SUBTERRANEAN CABLE SYSTEMS

CROSS REFERENCE TO RELATED APPLICATIONS

This application is a continuation in part of Ser. No. 08/077,210 filed 14 Jun. 1993 now abandoned. This latter application contains a reference to patent application Ser. No. 07/699,381 filed 13 May 1991 (now U.S. Pat. No. 5,154,869 dated 13 Oct. 1992) with a claim to the priority of German application P 40 16 726.7 filed 24 May 1990 and to application Ser. No. 07/916,335 filed 20 Jul. 1992, now abandoned.

FIELD OF THE INVENTION

The present invention relates to a method of providing a subterranean or buried cable installation, especially for electrical and optical cables adapted to run along distances beneath the ground. More particularly, the invention relates to a method of providing a cable conduit and cable arrangement adapted to be buried for long distances.

BACKGROUND OF THE INVENTION

For electrical cable and optical cable, e.g. communication cables which must be buried underground, it has been common practice to provide a conduit in a trench or other subterranean structure through which the cable can be fed. Experience has shown that the ability to push cables into such conduit is limited by the nature of the conduit and the nature of the cable, because of friction forces between then and that, unless considerable care is exercised, the cable can be damaged and can bunch up in the conduit preventing completion of the installation without considerable and time-consuming efforts.

Furthermore, the pulling of a cable through a conduit is also a delicate matter, especially in the case of sensitive cables like optical cables, since the application of excessive tensile forces can stress the cable or damage the latter more substantially.

As a consequence, even today when the art of laying subterranean cables, has developed to a significant extent, substantial problems remain in the installation of subterranean cable systems.

There have been efforts made to solve such problems and one approach has been to limit friction between the inner wall of the conduit and the outer surfaces of the cable by providing ridge structures or ribs on the inner wall of the conduit, thereby decreasing the contact regions between the inner wall of the conduit and the cable.

As described in German patent document 3,217,401 and in U.S. Pat. Nos. 5,069,254 and 5,036,891 all of H. Vogelsang, conduit assemblies are known comprising one or more tubes formed of a synthetic resin and interconnected transversely by longitudinally extending webs. Thus the tubes can be delivered rolled up on spools with the plurality of tubes and their webs in a flat coil. For use they are unwound, cut to length, and then bunched together to form the desired dense array of juxtaposed tubes through which electrical lines, e.g. wires or cables, are pulled or pushed.

In order to facilitate insertion of the cables, German patent document 3,529,541 of H. Vogelsang proposes forming the inner wall of each tube with longitudinally extending ridges alternating with longitudinally extending grooves. These longitudinally continuous and throughgoing formations reduce the contact area between the wires or cables being inserted through them to facilitate such insertion.

A major disadvantage of this arrangement is that the ridges invariably run somewhat along a helix like a screwthread due to the rotation of the worm in the extruder. These helically extending ridges impart some torsion to the electrical lines being pushed or pulled through the conduit. Hence these lines can twist up and get jammed, or can just wind about each other to form a bulky mass.

In above-cited copending application Ser. No. 07/699,381 (now U.S. Pat. No. 5,154,869) an electrical conduit for wires or cables is described which is formed by a tube extending along a longitudinal axis and having an inner wall formed with a plurality of longitudinally throughgoing ridges each formed by a plurality of longitudinally joined portions with every other portion inclined oppositely relative to the axis to the intervening portions. In other words the ridges run alternately along a right-hand helix and then a left-hand helix. Thus with this arrangement any torsion that the ridges apply to the wires or cables being pulled or pushed through the conduit will be canceled out from one portion to the next. In this manner there will be no twisting and bunching of the cables. The portions may be of varying pitch and may in fact be part circular. It is also possible for the portions to be substantially identical in which case they are straight and meet at corners. In this case the portions are all of the same pitch. German utility model 90 14 571 published 21 Mar. 1991 describes such an arrangement where the portions meet at smoothly curved corners, virtually having a sinusoidal shape.

The ridges of this system are of substantially triangular section and the tube has a predetermined wall thickness measured radially and the ridges have a radial height above the inner wall that is substantially less than the wall thickness. In addition the tube has a predetermined wall thickness measured radially and the ridges have an angular dimension that is substantially less than the wall thickness. The inner wall is formed between the ridges with grooves complementary to the ridges. It is possible for the ridges to be unitary with the tubing. They can also be separate elements that are applied in a separate stage so that the ridges are formed of a synthetic resin having a lower coefficient of friction than the tube.

The conduit of the earlier application is made by forcing the tube longitudinally through an annular opening defined internally by a mandrel or die itself formed with peripheral grooves that form the ridges and alternately oppositely rotating the inner tool. The rotation speed of the mandrel is varied continuously to produce ridges of varying pitch. The inner tool itself can operate without removal of material.

While these systems do offer various advantages, they still present occasionally excessive resistance to lines being pushed or pulled through them.

Indeed, it has now been found that simply providing such ribs or ridges on the inner wall of the conduit is not an answer, but rather, there are certain dimensional considerations and operational steps which are critical to ensuring the introduction of the cable into a conduit that must be observed to allow such insertion in length increments of a kilometer or more, especially with sensitive cables like electrical communication and optical communication cables.

OBJECTS OF THE INVENTION

It is, therefore, the principal object of the present invention to provide an improved method of laying a cable system over substantial distances whereby drawbacks of earlier systems are obviated.

3

Another object of this invention is to provide an improved method of producing buried electrical or optical cable in respective protective conduits which will minimize the danger of damage to cable.

SUMMARY OF THE INVENTION

I have discovered that the principles of the aforementioned copending applications can be applied in an improved method of providing a buried cable system when certain conditions are observed in the feeding of the cable into the conduit, whether the cable is a single cable or a bundle of a multiplicity of such cables. In particular I have found that it is possible to bury the cable in lengths of about 2000 m and to introduce the single cable or the cable bundle by blowing the cable into the conduit with a force of substantially 90 kN observing certain conditions which are quite different from the conditions under which a single cable or cable bundles can be pulled through tube lengths buried over distances of about 1400 m with a force of about 2.5 kN. I have found that under these conditions, there is no damage to electrical or optical communication cables which is quite surprising considering the long distances traveled by the cable from one end to the other of each segment of the conduit in which the cable is laid.

The invention thus can be treated in terms of these two aspects, namely, the blowing of a single cable or multiple-cable bundles through a given length of conduit or tubing, or the drawing of the cable or cable bundle therethrough, e.g. with a pulling member from the opposite end of the cable guide tube.

In accordance with the first aspect, the method may comprise the steps of:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 2,000 m of the tube extruded in step (a) in the ground so that only ends of the length are accessible;

(c) providing a cable having a rubber or plastic sheath and, for feeding through the length, having an outer radius of about 5 to 45 mm and an outer diameter $d_K \leq 0.84$ r, the cable being dimensioned to contact the ribs over a width b in a range of 0.05 to 3 mm; and (d) feeding the cable into one of the ends and entraining the cable through the length by blowing it therethrough with a force of substantially 90 kN until the cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

In this first aspect, moreover, for a multiple cable bundle the method comprises the steps of:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 2,000 m of the tube extruded in step (a) in the ground so that only ends of the length are accessible;

(c) providing a cable bundle of n cables having a rubber or plastic sheath and, for feeding through the length, having a sum $\Sigma_n A_K$ of the cable cross sections $A_K$ such that $\Sigma_n A_K \leq 0.18\, A_R$, said cable being dimensioned to contact the ribs over a width b in a range of 0.05 to 3 mm; and (d) feeding the cable into one of the ends and entraining the cable through the length by blowing it therethrough with a force of substantially 90 kN until the cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

In this aspect of the invention whereby the cable is drawn into and through the conduit, the method can comprise:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 1,400 m of the tube extruded in step (a) in the ground so that only ends of the length are accessible;

(c) providing a cable having a rubber or plastic sheath and, for feeding through the length, having an outer radius of about 5 to 45 mm and an outer diameter $d_K \leq 1.46$ r, the cable being dimensioned to contact the ribs over a width b in a range of 0.05 to 3 mm; and (d) feeding the cable into one of the ends and entraining the cable through the length by pulling it therethrough with a force of substantially 2.5 kN until the cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

In this aspect, for a multiple cable bundle, the method can comprise:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 2,000 m of the tube extruded in step (a) in the ground so that only ends of the length are accessible;

(c) providing a cable bundle of n cables having a rubber or plastic sheath and, for feeding through the length, having a sum $\Sigma_n A_K$ of the cable cross sections $A_K$ such that $\Sigma_n A_K \leq 0.53\ A_R$, said cable bundle being dimensioned to contact the ribs over a width b in a range of 0.05 to 3 mm; and (d) feeding the cable bundle into one of the ends and entraining the cable bundle through the length by pulling it therethrough with a force of substantially 2.5 kN until the cable bundle emerges from the opposite end and in such manner that a contact area A between the ribs and the cable at crossings of the cable bundle on the ribs is $$A = (0.16\ b^2\ z\ L_K)/r$$

where A is in a range of 4.5 to 32 mm² and $L_K$ is a length of the contact area and $L_K = ra/g$.

In all aspects of the invention the inner wall can be formed between the adjacent ridges with concave inwardly open valleys that merge smoothly with the respective ridges or ribs. The pitch a can be equal to between 45° and 340°, preferably about 180°.

According to a feature of the invention the dimensions relative to a length $L_K$ of the ridge/cable contact regions K can satisfy the equation:

$$A \cdot r = 0.16\ b^2\ z (0.0003\ r^2\ a^2 + L_K^2)^{1/2}.$$

The dimensions relative to a length $L_V$ of the corners can satisfy the equation:

$$A \cdot r = 0.16\ b^2\ z (0.0003\ r^2\ a^2 + L_K^2)^{1/2} + 4\ L_V b \cdot r.$$

The invention, therefore, allows the cable to be laid in increments of significant length, i.e. about 2000 m in the case of the blowing operation and about 1400 m in the case of a drawing operation, without blocking of the cable with a consequence of torsional factors and without jamming or like injury to the cable.

The low forces which are applied, of course, minimize the injury to the cores, whether they are optical fibers or electrical conductors, as well as any damage to the insulating sheath or protective covering.

Advantageously in all embodiments the rib crest width b is about 0.1 mm.

While it has been found that foregoing relationships between the dimensions ensures very little friction. This is particularly true when the ridges have a radial height of between 0.3 mm and 0.5 mm.

According to a further feature of this invention the inner wall is formed between the ridges with grooves complementary to the ridges. The wave length is about 100 cm and the amplitude is between one-eighth and one-fourth of the inside diameter. The inside diameter is between 30 cm and 70 cm, preferably about 50 cm. Normally the amplitude is between one-eighth and one-fourth of the inside diameter and the inside diameter is between 30 cm and 70 cm.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 6 is a diagrammatic perspective view illustrating one aspect of the method;

FIG. 7 is a view similar to FIG. 6 showing another aspect of the invention; and

FIG. 8 is a perspective view showing a cable bundle which can be blown into the conduit (FIG. 6) or drawn therethrough (FIG. 7) according to the invention.

SPECIFIC DESCRIPTION

Figure 1:
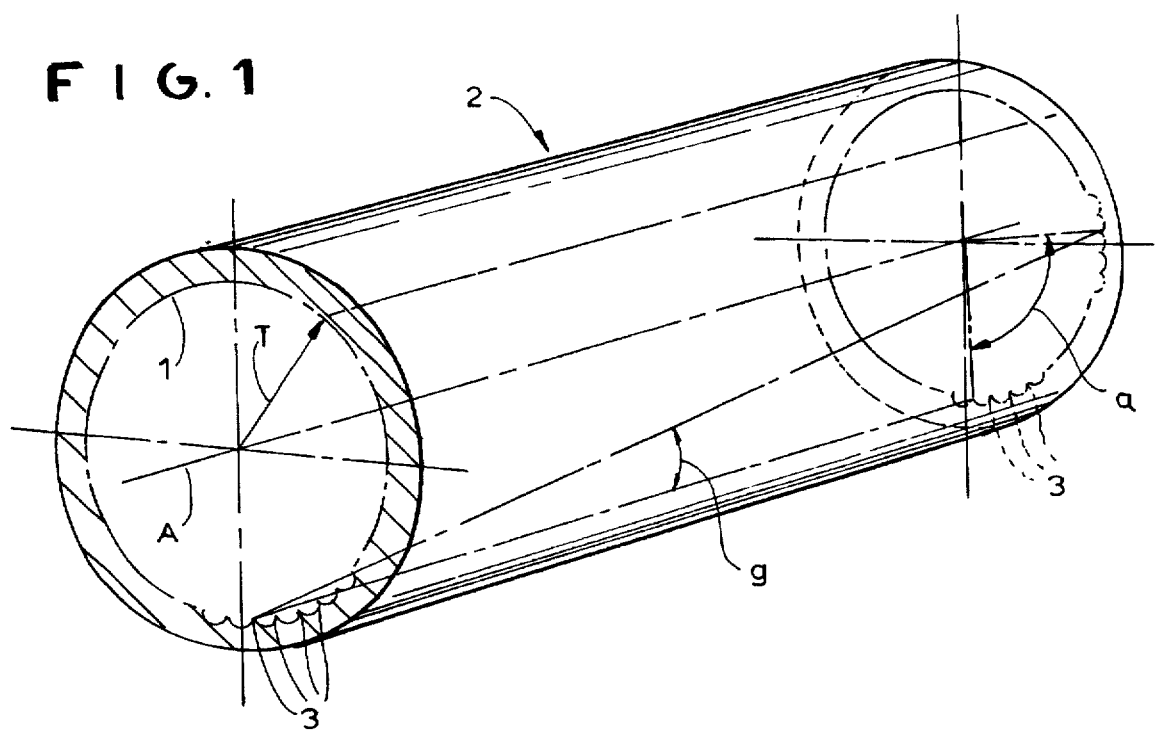
FIG. 1 is a perspective view of a conduit according to the invention.
Figure 2:
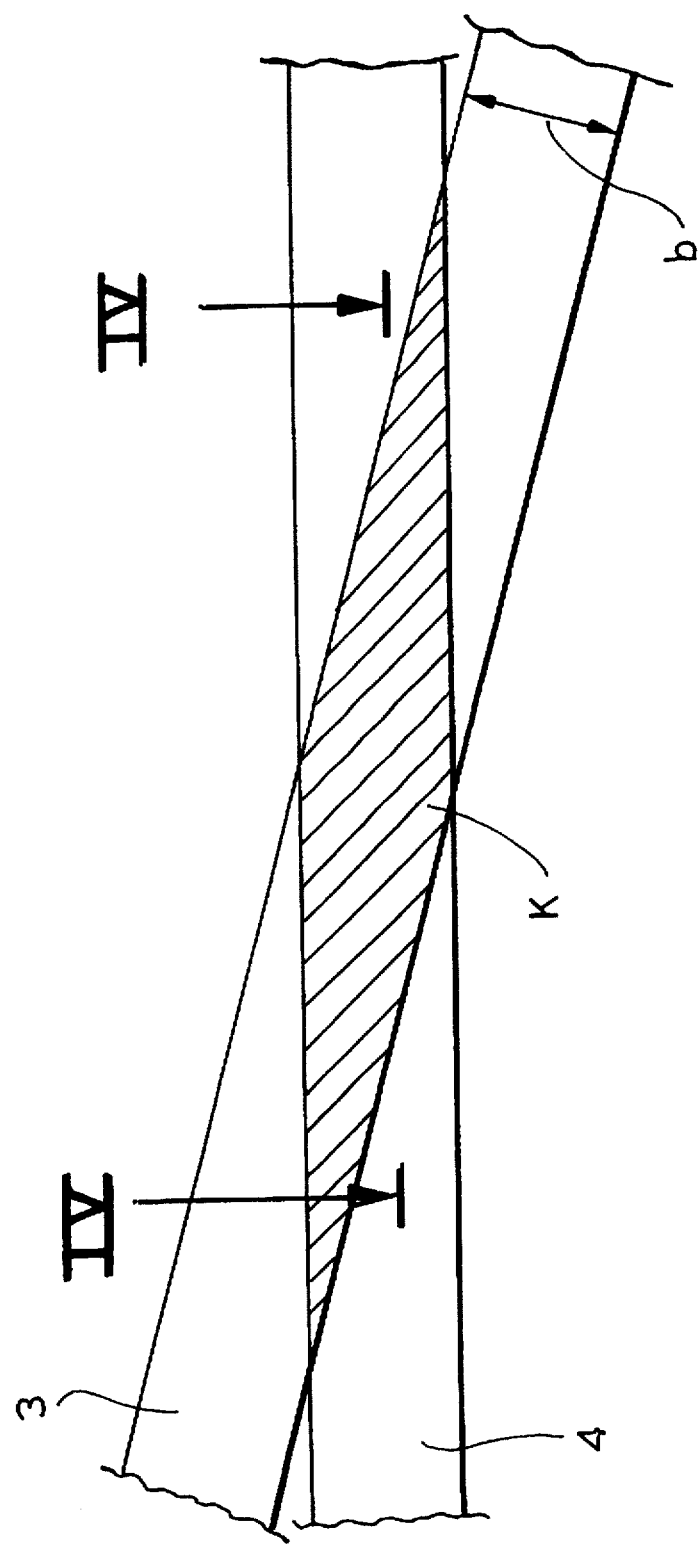
FIG. 2 is a diagrammatic view illustrating a region of contact between a conduit ridge and an electrical line or cable in the conduit.
Figure 3:
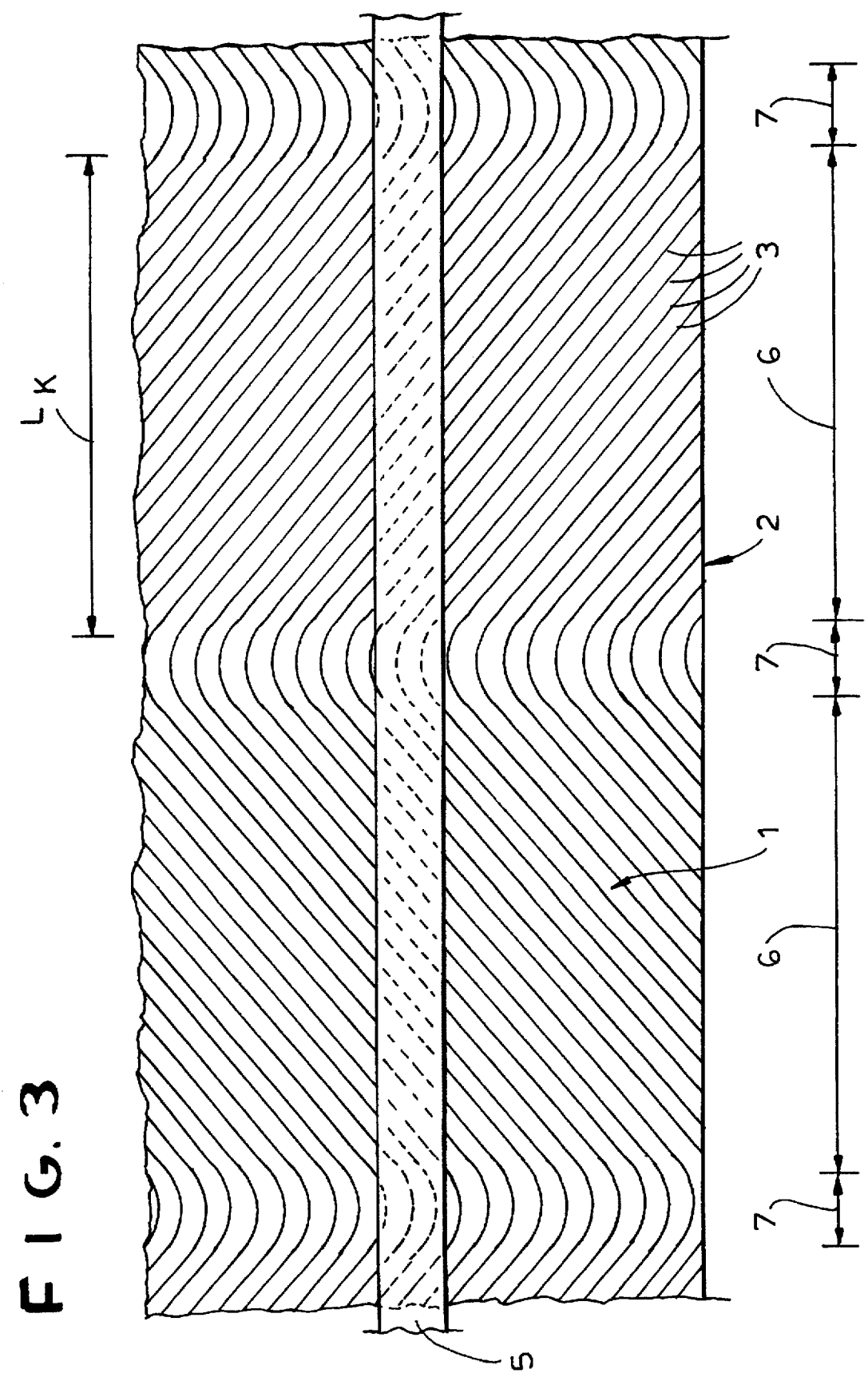
FIG. 3 is a side view of the inside of the conduit showing an electrical line in the conduit.

Turning first to FIG. 6 it can be seen that the invention involves the formation of a conduit 2 which is buried in a trench 100 formed in the ground 101 and having one end 103 and an opposite end 102 exposed for the insertion of a cable 10 from a reel 104. The cable is entrained through the conduit 2 by compressed air with a force of substantially 90 kN, the compressed air source being represented at 105. According to the invention, the cable outer diameter $d_K$ should be equal to or less than 0.84 r where r is a radius of the conduit, for lengths of buried conduit of about 2000 m. The trench can be back-filled at 106. When a multistrand cable 108 (FIG. 8) is used, with n cables, a sum of the cable cross sections $A_K$ is equal to or less than 0.18 $A_R$, the cross sectional area of the conduit.

Alternatively, (FIG. 7) a strand 200 can be inserted into the conduit 2 buried in the trench 201 so that it ties ends 202 and 203 are exposed, can engage the cable 10 on the reel 204 to draw the cable 10 through the conduit 2 over its length of about 1400 m, the back-filling being represented at 205. In that case, $d_K$ is less than or equal to 1.46 r and the force with which the cable is buried through the tube is about 2.5 $k_N$.

When n cables form the bundle 108 in this case, the sum of the cable cross sections $A_K$ is equal to or less than 0.53 $A_R$.

The strand 200 can be pulled with the force of about 2.5 kN by a winch represented at 206.

As can be seen in FIGS. 1 through 5, a conduit 2 according to the invention is unitarily formed of a durable thermoplastic synthetic resin with unillustrated webs or flanges that are connected to other such conduits 1 as described in the above-cited patent documents. This conduit tube 2 is centered on a longitudinal axis A and has an inner wall 1 that is cylindrical and also centered on the axis A and that is formed with triangular-section ridges 3 separated by complementary triangular-section grooves 9 (see FIG. 5). The ridges 3 are of basically zig-zag shape (see FIG. 2).

FIGS. 2 through 5 show how a cable 10 inserted through the conduit 2 engages the ridges 3 along a strip 4 that intersects each of these ridges 3 at a rhombic or diamond-shaped contact region K. In this arrangement as seen in FIG.

3 the ridges 3 are each formed by straight portions 6 of constant pitch a meeting at corners 8. The straight portions 6 have an axial dimension $L_K$.

According to the invention these dimensions form with the following relationship:

$$A \cdot r = 0.16\, b^2\, z\, L_K,$$

where:

A=the surface of area K, equal to between 4.5 mm² and 32 mm²;

r=the radius of the conduit or D/2;

b=the width of the contact region K; and z=the number of ridges 3.

Furthermore the pitch g in radians is equal to:

$$g = r \cdot a / L_K$$

and is equal to between 0.001 rad and 1.2 rad.

Normally radius r is equal to between 12 mm and 100 mm and $L_K$ is between 500 mm and 10,000 mm, depending on the diameter of the cable 10 which can range from 5 mm to 45 mm. In the illustrated embodiment the pitch a is equal to about 180°.

Figure 5:
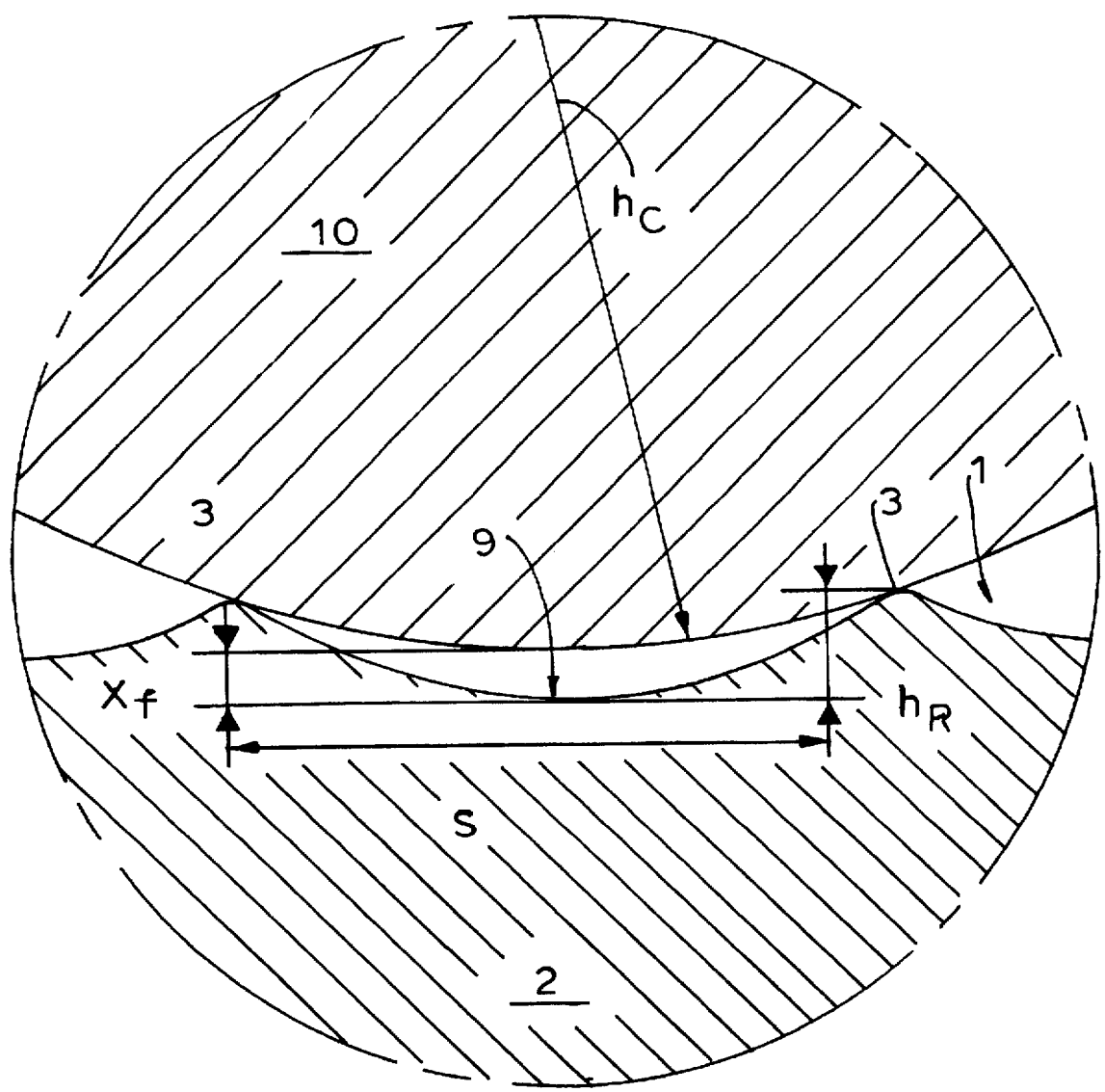
FIG. 5 is a cross section in very large scale illustrating a conduit and cable according to the invention.

According to a further feature of this invention as shown in FIG. 5 the ridges 3 are spaced angularly apart by a spacing s and have a radial height $h_R$ which is such that, with a cable of a given radius $r_C$ of curvature, the cable only projects into the valleys 9 by a distance which comes short by sa spacing $x_f$ from the base of the valleys 9, not making contact therewith. Thus the cable 10 rides wholly on the crests of the ridges 3.

Furthermore the following equation applies to the dimension $L_K$:

$$A \cdot r = 0.16\, b^2\, z(0.0003\, r^2\, a^2 + L_K^2)^{1/2}.$$

Similarly, the dimension $L_V$ satisfies the equation:

$$A \cdot r = 0.16\, b^2\, z(0.0003\, r^2\, a^2 + L_K^2)^{1/2} + 4\, L_V b \cdot r.$$

Figure 4:
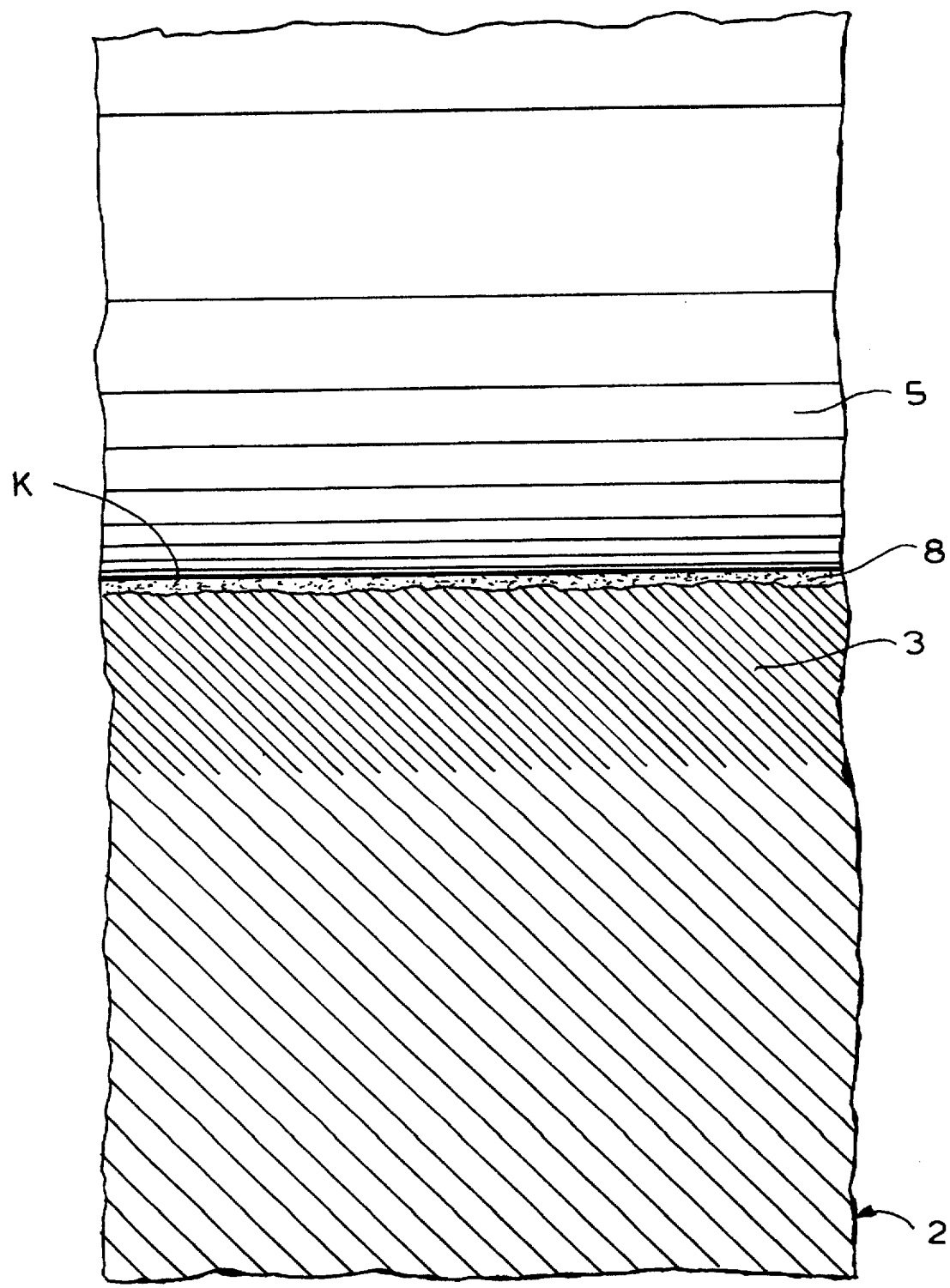
FIG. 4 is a large-scale section taken along line IV—IV of FIG. 2 during feeding of the line through the conduit.

With the system of this invention it has been found extremely advantageous to pull or push the cable through the conduit 2 at such a speed as to heat and fuse the crests or outer edges of the contact zone K as shown at 8 in FIG. 4. This produces a lubricant effect that works so long as the cable is being pulled through the conduit, but that disappears, leaving the conduit dry, once the cable is in position. The lubricant effect of the fused film 8 in the regions K is excellent, better in fact than the prior-art system of squeezing a lubricant, typically a soap solution into the conduit. The main advantage is that this lubricant effect is achieved all along the cable, wherever it contacts the conduit so that the prior-art problems of uniform distribution of the lubricant are wholly avoided.

Below is a Table that gives a sampling of conduits according to the invention.

TABLE

| Aspect of Conduit | Designation | | | |
|---|---|---|---|---|
| | 32 × 3.0 | 50 × 4.6 | 110 × 6.3 | 225 × 12.8 |
| Outside diameter (mm) | 32.0 | 50.0 | 110.0 | 225.0 |
| Wall thickness t (mm) | 3.0 | 4.6 | 6.3 | 12.8 |
| Inside diameter D or 2r (mm) | 26.0 | 40.8 | 97.4 | 199.4 |
| Number z of ridges | 26 | 40 | 40 | 82 |
| Ridge spacing (mm) | 3.14 | 3.20 | 7.65 | 7.65 |
| Pitch angle a (°) | 180 | 180 | 180 | 180 |
| Ridge contact width b (mm) | 0.1 | 0.1 | 0.1 | 0.1 |
| Length of ridge contact (mm) | 1275 | 2000 | 4775 | 9775 |
| Length $L_V$ of bights (mm) | 2 | 2 | 2 | 2 |

I claim:

1. A method of producing a subterranean stretch of a cable, comprising the steps of:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 2,000 m of the tube extruded in step (a) in the ground so that only ends of said length are accessible;

(c) providing a cable having a rubber or plastic sheath and, for feeding through said length, having an outer radius of about 5 to 45 mm and an outer diameter $d_K \leq 0.84\, r$, said cable being dimensioned to contact said ribs over a width b in a range of 0.05 to 3 mm; and (d) feeding said cable into one of said ends and entraining said cable through said length by blowing it therethrough with a force of substantially 90 kN until said cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

2. A method of producing a subterranean stretch of a cable, comprising the steps of:

(a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;

(b) burying a length of about 1,400 m of the tube extruded in step (a) in the ground so that only ends of said length are accessible;

(c) providing a cable having a rubber or plastic sheath and, for feeding through said length, having an outer radius of about 5 to 45 mm and an outer diameter $d_K \leq 1.46\, r$, said cable being dimensioned to contact said ribs over a width b in a range of 0.05 to 3 mm; and (d) feeding said cable into one of said ends and entraining said cable through said length by pulling it therethrough with a force of substantially 2.5 kN until said cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

3. A method of producing a subterranean stretch of a cable, comprising the steps of:
   (a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;
   (b) burying a length of about 2,000 m of the tube extruded in step (a) in the ground so that only ends of said length are accessible;
   (c) providing a cable bundle of n cables having a rubber or plastic sheath and, for feeding through said length, having a sum $\Sigma_n A_K$ of the cable cross sections $A_K$ such that $\Sigma_n A_K \leq 0.18\, A_R$, said cable being dimensioned to contact said ribs over a width b in a range of 0.05 to 3 mm; and
   (d) feeding said cable into one of said ends and entraining said cable through said length by blowing it therethrough with a force of substantially 90 kN until said cable emerges from the opposite end and in such manner that a contact area A between the ribs and the cable at crossings of the cable on the ribs is $$A = (0.16\, b^2\, z\, L_K)/r$$

where A is in a range of 4.5 to 32 mm² and $L_K$ is a length of the contact area and $L_K = ra/g$.

4. A method of producing a subterranean stretch of a cable, comprising the steps of:
   (a) extruding a cable-guide tube of circular cross section and an internal radius r of 12 to 100 mm from a thermoplastic and with a number z of internal support ribs angularly equispaced around the interior of the tube, the support ribs extending along the length of the tube in a wave pattern of adjoining segments each extending over an angle a about an axis of the tube and having a pitch g of substantially 0.001 to 1.2 rad;
   (b) burying a length of about 2,000 m of the tube extruded in step (a) in the ground so that only ends of said length are accessible;
   (c) providing a cable bundle of n cables having a rubber or plastic sheath and, for feeding through said length, having a sum $\Sigma_n A_K$ of the cable cross sections $A_K$ such that $\Sigma_n A_K \leq 0.53\, A_R$, said cable bundle being dimensioned to contact said ribs over a width b in a range of 0.05 to 3 mm; and
   (d) feeding said cable bundle into one of said ends and entraining said cable bundle through said length by pulling it therethrough with a force of substantially 2.5 kN until said cable bundle emerges from the opposite end and in such manner that a contact area A between the ribs and the cable at crossings of the cable bundle on the ribs is $$A = (0.16\, b^2\, z\, L_K)/r$$

where A is in a range of 4.5 to 32 mm² and $L_K$ is a length of the contact area and $L_K = ra/g$.

5. The method defined in claim 1 or claim 3 wherein b is about 0.1 mm.

6. The method defined in claim 1 or claim 3 wherein the inner wall is formed between adjacent ridges with concave inwardly open valleys that merge smoothly with the respective ridges.

7. The method defined in claim 1 or claim 3 wherein the pitch a is equal to between 45° and 340°.

8. The method defined in claim 7 wherein the pitch a is equal to about 180°.

9. The method defined in claim 1 or claim 3 wherein the dimensions relative to a length $L_K$ of the ridge/cable contact regions K satisfy the equation:

$$A \cdot r = 0.16\, b^2\, z (0.0003\, r^2\, a^2 + L_K^2)^{1/2}.$$

10. The method defined in claim 1 or claim 3 wherein the dimensions relative to a length $L_V$ of the corners satisfy the equation:

$$A \cdot r = 0.16\, b^2\, z (0.0003\, r^2\, a^2 + L_K^2)^{1/2} + 4\, L_V \cdot b \cdot r.$$

* * * * *